United States Patent Office 3,562,352
Patented Feb. 9, 1971

3,562,352
POLYSILOXANE-POLYURETHANE
BLOCK COPOLYMERS
Emery Nyilas, Bedford, Mass., assignor to Avco Corporation, Cincinnati, Ohio, a corporation of Delaware
No Drawing. Filed Sept. 6, 1968, Ser. No. 758,141
Int. Cl. C08g 41/04, 47/10
U.S. Cl. 260—824                                29 Claims

ABSTRACT OF THE DISCLOSURE

Block-copolymers of a polyurethane and a polysiloxane having direct silicon to nitrogen linkages, a method for their formation and articles formed therefrom. The copolymers are formed by a condensation type reaction between reactive terminal groups of the polysiloxane and the urethane-amide groups of the polyurethane. Inasmuch as the reaction involves only the amino groups of the polyurethane, both polyether and polyester urethanes may be used. The preferred block-copolymers are those having a minor portion of poly(dialkylsiloxane) segments and a major portion of polyurethane segments. These copolymers are characterized by a high degree of blood compatibility and consequently, are useful in providing blood contact surfaces for devices used for direct implantation into the body or for extracorporeal circulation of blood such as circulatory assist devices including auxiliary ventricles and intra-aortic balloons, and various types of blood pumps.

BACKGROUND OF THE INVENTION (1) Field of the invention

This invention relates to mixed synthetic resins, and more particularly, to block-copolymers of a polysiloxane and a polyurethane.

(2) Description of the prior art

The use of polysiloxane with polyurethane is known in the art. For example, it has been suggested that silicon compounds such as a poly(dimethylsiloxane) should be included in the preparation of some polyurethane foams to act as a pore-regulating agent or stabilizer in a foamable reaction mixture. The poly(dimethylsiloxane) performs a purely physical function in decreasing surface tension of the polyurethane and promoting micelle formation in the melt. No chemical reaction is involved.

In addition to the above, it is known in the art to cross link polyurethanes with diphenylsilanediol and to form silico-urethane copolymers by reaction of a reactive organo-silicon compound directly with an isocyanate. For example, in U.S. Pat. No. 3,243,475, there is disclosed a process for making a polyurethane copolymer wherein a hydroxylated polyester is reacted with a polyisocyanate to form a polyurethane in a reaction mixture containing an organo-silicon compound having at least one group containing hydrogen atoms reactive with an isocyanate (—NCO) group. In U.S. Pat. No. 3,246,048, a process for making a polyurethane is disclosed wherein a hydroxylated polyether is reacted with a polyisocyanate in a reaction mixture containing an organo-silicon compound having at least one group containing hydrogen atoms reactive with isocyanate groups.

In each of the above noted patents, it is disclosed that a relatively restricted class of organo-silicon compounds are suitable for the formation of copolymers because the hydrogen atom which is required to react with the isocyanate group to link the urethane and silicon components together is not directly attached to a silicon atom, but is part of a carbinol group. The carbinol group will react with an isocyanate regardless of whether or not it is attached to a siloxane chain. In the copolymers disclosed, there are no nitrogen-silicon bonds. The linking of silicon segments is accomplished by means of at least one intermittent carbon atom. In addition, the class of organo-silicon compounds useful for the formation of polyether urethanes differs from the class of organo-silicon compounds useful for the formation of polyester urethanes. Inasmuch as monomeric materials are used in the process of the patents, the copolymers formed are random copolymers difficultly identifiable rather than ordered copolymers. Consequently, there is little control of copolymer properties and properties cannot be readily tailored to suit a particular industrial need.

STATEMENT OF THE INVENTION

The subject invention provides novel block-copolymers of a polyurethane and a pilysiloxane having direct silicon to nitrogen linkages, a facile method for their formation and articles formed therefrom. The block-copolymers are formed by a condensation type reaction between the urethane-amide groups of a preformed polyurethane and reactive terminal groups on a preformed polysiloxane, preferably reactive acetate groups. Both polyester and polyether urethanes may be reacted with polysiloxane by the process of the invention. The block-copolymers of this invention are characterized by excellent mechanical stability at cryogenic temperatures and are readily cast into film and sheet. The preferred block-copolymers are formed from a major portion of a polyurethane and a minor portion of a poly(dialkylsiloxane). The preferred copolymers are characterized by a high degree of blood compatibility which is greater than that of the component homopolymers and are useful for devices requiring blood contact surfaces intended for implantation into the human body or for extracorporeal circulation of blood.

DESCRIPTION OF THE PREFERRED EMBODIMENTS

The block-copolymers of this invention comprise blocks of a polysiloxane and blocks of a urethane selected from the group of polyether urethanes and polyester urethanes linked to each other by a silicon to nitrogen bond.

The polysiloxanes suitable for the formation of block-copolymers in accordance with the invention are derived from materials well known in the art and described in numerous publications such as the Modern Plastics Encyclopedia for 1968, McGraw-Hill Publishing Company, N.Y., pages 262–264. Basically they consist of a backbone of alternating atoms of silicon and oxygen with radicals attached to the silicon atoms such as alkyl-, alkoxy-, aryl-, such as phenyl-, allyl-, vinyl-, and haloalkyl- having at least three carbon atoms between the halogen atom and silicon atom. The block-copolymers of the invention can be formed from linear to moderately branched polysiloxanes having from between about 3 to 100 or more repeating units. The block-copolymers exhibiting excellent blood-compatibility properties are those formed from polysiloxanes having lower alkyl substituents, e.g., methyl-, ethyl-, propyl-, and butyl- on the alternating silicon atoms. The most preferred polysiloxane for forming block-copolymers in accordance with the invention is poly(dimethylsiloxane).

Inasmuch as the block copolymers are formed from preformed polyurethanes, ether polyether urethanes or polyester urethanes are suitable through the polyether urethanes are preferred because they provide copolymers of greater hydrolytic stability. The selection of the polyurethane is not critical though the final product will have properties similar to those of the selected polyurethane.

As is known in the art, polyurethanes are formed by reaction of an isocyantes group with the hydrogen of a hydroxyl group to form the urethane linkages. Any of the isocyanates heretofore used for the formation of polyurethanes are suitable for purposes of the present invention. Examplary of the preferred isocyanates are ethylene diisocyanate, propylene diisocyanates, tetramethylene diisocyanate, pentamethylene diisocyanates, octamethylene diisocyanate, undecamethylene diisocyanate, dodecamethylene diisocyanates, 3,3'-diisocyanato dipropylether, cyclopenthylene - 1,3-diisocyanate, cyclohexalene-1,4-diisocyanates, 2,4-tolylene diisocyanate, 2,6-tolylene diisocyanate, and mixtures with 2,4-tolylene diisocyanate, xylylene-1,4-diisocynate, xylylene-1,3-diisocyanate, 4,4-diphenylmethane diisocyanate, 2-nitrodiphenyl-4,4'-diisocyanate, 4,4'-diphenylpropane diisocynate, p-isocyanatobenzyl isocyanate, m-phenylene diisocyanate, p-phenylene diisocyanate, naphthalene-1,4-diisocyanate, naphthalene-1,5-diisocyanate, furfurylidene diisocyanate, p,p',p''-triphenylmethane triisocyanate, diphenyl-4,6,4'-triisocyanate, and the like.

To form the polyurethane, the isocyanate is reacted with a polyol that contains more than one —OH group. Typical polyols include hydroxy-rich polyesters and polyethers. The polyester may be prepared by the thermal esterification of any glycol such as ethylene glycol, diethylene glycol, or any other polyhydric alcohol such as trimethylolpropane, glycerine, sorbitol or the like with a polycarboxylic acid such as adipic acid, succinic acid and the like.

Suitable polyethers can be prepared, for example, by the polymerization of an alkylene oxide or by the condensation of alkylene oxide with a polyhydric alcohol as is well known in the art. Examples of alkylene oxides include ethylene oxide, 1,2-propylene oxide, 1,2-butylene oxide, and 1,3-propylene oxide. Examples of polyhydric alcohols include propylene glycol, glycerol, trimethylolethane, trimethylolpropane, 1,2,6-hexanetriol, pentaerythritol and the like.

The block copolymers of this invention result from a process which is essentially a condensation type reaction between the urethane-amide group of a polyurethane and a reactive terminal group of the polysiloxane, preferably an acetate or hydroxy group. Since only the urethaneamide of the polyurethane is involved in the reaction, it may be performed with either a polyether urethane or a polyester urethane.

The following equation is set forth for purposes of illustration and represents the reaction of a polyurethane with a polysiloxane terminated with an acetate end group:

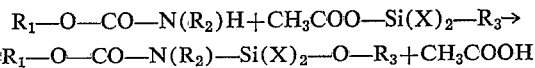

$R_1$—O—CO—N($R_2$)—Si(X)$_2$—O—$R_3$+$CH_3COOH$

In the equation, $R_1$ and $R_2$ represent segments of the polyurethane chain, $R_3$ the remainder of the polsiloxane chain and X substituents attached to the silicon atom. It should be noted that the linkage between segments of the block-copolymers are silicon-nitrogen bonds.

The above condensation reaction is performed in solution at elevated temperatures over an extended period of time. The preferred solvents are the so-called hydrogen-bonding solvents and include dioxane and tetrahydrofuran. The solvation of the polyurethane macromolecule by these solvents involves a loose attachment of solvent molecules to the urethane amide groups via hydrogen-bonding. If the amide group which is supposed to undergo reaction with the polysiloxane terminal group, is in a solvated state by some H-bonding mechanism, this will also involve some weakening of the nitrogen-hydrogen covalent bond within the amide group because the solvating molecule will pull the proton somewhat away from the nitrogen atom. The result of solvation by a hydrogen-bonding solvent will be, therefore, an increased reactivity of the urethane amide group.

It is desirable that the above illustrated reaction between the polyurethane and acetoxy end blocked polysiloxane be performed under anhydrous conditions. Otherwise, the hydrolysis reaction between water and the acetate groups with the formation of silanol groups will proceed at a faster rate than the reaction of the acetate groups with the urethane amide groups.

The above described condensation type reaction may also be performed with a polysiloxane having terminal hydroxyl groups. However, the terminal hypdroxyl group is less reactive than its acetate counter part and elevated temperature, i.e., in excess of 100° C., and the presence of a dehydrating agent is necessary. Preferably, the dehydrating agent is volatile, acetic anhydride being preferred.

In the above described reactions dependent upon reaction conditions, the majority of the available reactive terminal groups of the polysiloxane will react with the available urethane groups. The materials so formed are essentially elastomeric. Further bonding between the polyurethane and polysiloxane components may be desirable in order to obtain, for example, elastomers having a higher elastic modulus. This can be accomplished in at least two ways. First, the block-copolymers may be heated in the solid state or in the melt, at temperatures in excess of 100° C. or more, preferably within the range of 110–120° C. for a period of time dependent upon the degree of cure desired. A period of up to four hours is desirable. Secondly, additional randomly distributed cross-links between polymer chains can be established by the action of an organic peroxide catalyst at elevated temperatures. The incorporation of the peroxide catalyst into the block-copolymer is preferably accomplished after the block-copolymer has been formed but is still in solution. After recovering by the evaporation of solvents, the block-copolymers are heated to trigger the peroxide-induced cross-linking reaction which is preferably performed at 110–120° C. in a maximum of 2 hours. The peroxide used constitutes a maximum of 2% by weight of the total solids.

The preferred copolymers in accordance with this invention are those having at least 50% of a polyether urethane and a maximum or 50% of a poly(dialkylsiloxane). These polymers exhibit a high degree of blood-compatibility which possibly is correlated with its surface composition. If compared in terms of the clotting time of freshly withdrawn whole human blood for example, the blood-compatibility of a polyurethane-poly (dimethylsiloxane) block-copolymer is significantly greater than any of its component homopolymers. As a result of this high degree of blood-compatibility, the block-copolymers of the invention are useful in providing blood contact surface for devices intended for implantation into the body or used for extracorporeal circulation of blood. Dependent upon the use, devices having blood-contact surfaces may be fabricated from the block-copolymer or coated with the copolymer. Typical uses include auxiliary ventricles, intra-aortic balloons, various types of blood pumps and suturable grafts.

Though not wishing to be bound by theory, it is believed that the excellent blood-compatibility properties of the block-copolymers of this invention are due in part, to an absence of hydrogen bonding sites. It is known that blood is a colloidal system of living cells suspended in a solution of electrolyte and stabilizing proteins. It will retain its native state under normal conditions as long as it remains within its natural environment such as blood vessels. However, contacting blood with a foreign surface will induce a series of alterations in blood which lead to coagulation. The formation of blood clots, i.e., thrombi and/or emboli, on the surface of an implanted device in vivo can be lethal and defeats the purpose of the device. It is believed that the primary steps in the coagulation process is the denaturing of blood proteins due to contact with foreign surfaces.

The natural state of blood protein is known to be associated with a particular structure, i.e., the native configuration of the molecule. If its native configuration is distorted which can be accomplished by a variety of effects, the protein molecule becomes denatured. When blood is placed in contact with the solid surface, native blood proteins will become adsorbed on that surface from the bulk of the liquid phase. The adsorbed blood proteins will be affected by short range forces emanating from the surface. The effect of these forces can be measured in terms of the interaction energy which arises between surfaces and the protein adsorbates. The first postulate upon which the present invention is based is that there is a direct relationship between the interaction energy arising in a given surface/protein adsorbate system and the degree to which the native protein adsorbate will be denatured in that system. The smaller the interaction energy, the less will be the resulting denaturing effect of the surface. Since the residence time of an adsorbate on a surface is known to vary exponentially with the interaction energy arising between them, on surfaces that do not give rise to large interaction energy with native blood proteins, the residence time of these proteins will be relatively short. The relatively short residence time is also a factor which can contribute to decreasing the denaturing effect of a contact surface on adsorbed native blood protein.

The second postulate upon which the present invention is based is that the interaction energy which arises between a contact surface and native blood protein is a function of the combined hydrogen-bonding and van der Waals bonding capabilities of the surface (normalized to unit area). A reduction of the surface density of potential hydrogen-bonding sites and/or reducing the size of areas over which a systematic pattern of van der Waals bonds can be established would therefor decrease the interaction energy with blood protein adsorbates. A decreased interaction energy will result in a proportionally smaller extent of protein denaturation or, conversely in an increased degree of blood-compatibility of the contact surface.

The block-copolymers formed from poly(dialkylsiloxane) and polyurethane are believed to achieve a high degree of blood-compatibility by compliance with both of the aforesaid postulates. A reduction of the interaction energy which arises between the block-copolymer surface and adsorbed blood proteins as well as a decrease in the extent of surface-induced denaturation of the adsorbed protein is believed to be accomplished in two ways. First, a decrease of the surface density of potential hydrogen-bonding sites is performed in the course of the reaction which leads to the formation of block-copolymers. In the separated polyurethane and poly(dialkylsiloxane) homopolymers, the urethane and the terminal silanol groups represent, respectively, hydrogen bonding sites. In the reaction yielding the block-copolymers, the terminal group of the poly(dialkylsiloxane) will link into the urethane group thereby eliminating the hydrogen bonding capability of both groups. Secondly, the introduction of siloxane chains into a polyurethane surface reduces the size of areas over which a quasi-ordered system of recurring van der Waals bonds with adsorbed proteins can be established.

The following examples are illustrative only and should not be construed as limiting the invention thereto.

EXAMPLES 1–7

A series of four block-copolymers were formed from a poly(dimethylsiloxane) and a polyether urethane, each of the block-copolymers differing in their ratio of homopolymer components. The polyether urethane was prepared from polypropylene glycol having an average molecular weight of 1025 and methylene bis(4-phenylisocyanate) using procedures known to the art. The polyether urethane had a total nitrogen content of approximately 2.1% as determined by combustion, and had an intrinsic viscosity of 0.62 deciliter per gram (dl./g.) as measured in dioxane at 25° C. The poly(dimethylsiloxane) was acetate end-blocked and had 8 terminal groups per molecule. It had an intrinsic viscosity of approximately 0.27 dl./g. as measured in absolute toluene at 25° C.

Each of the block-copolymers were formed following the same procedure. A solvent system was prepared comprising 70 parts by weight of tetrahydrofuran and 90 parts by weight of dioxane. Prior to use, both solvents were purified and made anhydrous by repeated fractional distillations. The polyether urethane was dissolved in the solvent mixture with mild heating and continuous stirring. Air was excluded and a solution of an acetate end-blocked poly(dimethylsiloxane) dissolved in 15 parts by weight of purified tetrahydrofuran was slowly added to the polyether urethane solution. The so formed mixture was heated to and maintained within the range of 40° C. to 50° C. for six to ten hours with continuous stirring to provide a solution having dissolved copolymer comprising blocks of the poly(dimethylsiloxane) and blocks of the polyether urethane.

To determine the degree of blood-compatibility of the so-formed block-copolymers, solutions were coated onto the walls of 16 mm. I.D. test tubes and allowed to dry at room temperature for from 24 to 48 hours, during which time all of the acetic acid liberated from the acetate end-blocked poly(dimethylsiloxane) evaporated. Film thickness on the walls of the test tubes were all about 0.003 inch. A quantity of about 3 to 5 ml. of freshly drawn blood was dispensed into the coated test tubes and the time to coagulate at 37° C. determined. For purposes of comparison, freshly drawn blood of the same donor was dispensed into uncoated test tubes and test tubes coated with either the polyether urethane homopolymer or with the poly(dimethylsiloxane) homopolymer. The results obtained as well as the weight percentage of poly(dimethylsiloxane) to polyurethane comprising each of the block-copolymers is set forth in the following table.

| Example No.: | Polyurethane | poly(Dimethylsiloxane) | Coagulation time, min.[1] |
|---|---|---|---|
| 1 | 90 | 10 | 63–66 |
| 2 | 80 | 20 | 54–56 |
| 3 | 70 | 30 | 70–73 |
| 4 | 60 | 40 | 68–71 |
| 5 | 100 | 0 | 24–28 |
| 6 | 0 | 100 | 28–32 |
| 7 | uncoated glass | | 5–7 |

[1] Average of 5 tubes.

As can be seen from the above table, the coagulating times for blood in tubes coated with a film of the block-copolymers of this invention are substantially in excess of the coagulating time of blood in the uncoated tube or tubes coated with either of the homopolymers alone.

EXAMPLE 8

A block-copolymer was formed from a polyether urethane and a poly(dimethylsiloxane). The polyether urethane had an intrinsic viscosity of 0.52 dl./g. as measured in dioxane at 25° C. and a total nitrogen content of approximately 2.7% as determined by combustion. It was prepared from a polypropylene glycol having an average molecular weight of 450 and 2,4-toluenediisocyanate using known procedures. The poly(dimethylsiloxane) was acetate end-blocked and had an intrinsic visocisty of 0.24 dl./g. as measured in absolute toluene at 25° C. The block-copolymer was formed according to the following method.

A solvent system was prepared comprising 1000 parts by weight tetrahydrofuran and 1200 parts by weight dioxane. Both solvents had been purified and made anhydrous by repeated fractional distillations. Approximately 405 parts by weight of the polyether urethane were dissolved in the solvent with mild agitation. Thereafter, a solution of 45 parts by weight of the acetate end-blocked poly(dimethylsiloxane) dissolved in 300 parts by weight of freshly distilled anhydrous tetrahydrofuran was added to the polyether urethane solution, slowly over a period of approximately 60 minutes with constant strong agitation. The mixture was maintained at 35° C. to 40° C. for ten hours with rapid stirring continued. The resulting block-copolymer may be formed into film or sheet or coated onto a surface using dip, molding or spraying techniques known to the art.

A tube formed from the above block-copolymer having an inside diameter of 1.8 cm., a length of 12.5 cm. and a wall thickness of 0.05 cm. was prepared by dipping a highly polished stainless steel mandril of corresponding size into the solution of the block-copolymer and allowing the film formed on the mandril to cure and dry for 48 hours in a filtered air-atmosphere. The tube was removed from the mandril and steam sterilized. It was used to replace a 12 cm. section of the descending thoracid aorta in an experimental pig. After the pig had recovered from surgery, it was allowed to carry on its normal activities for a period of 110 days. Thereafter, the implanted tube was removed and examined. During the period of implantation, the tube had not caused any detectable pathological effect on the animal. In addition, the tube showed no detectable degradation despite its long-term exposure to the biological environment.

EXAMPLE 9

The procedure of Example 8 was repeated to form a polyetherurethane poly(dimethylsiloxane) block-copolymer in a mixture of tetrahydrofuran and dioxane. Following formation of the block-copolymer, about 5 to 8 parts by weight of freshly purified anhydrous cyclohexanone were added to about 10 parts of the copolymer solution maintained at room temperature. The resulting solution was transferred to a precleaned pressure can and sprayed through a nozzle in small quantities at a time, onto a helically-shaped rhodium plated mandril having a highly polished surface. The spraying was continued until a film of block-copolymer of approximately 0.06 cm. in thickness was formed on the mandril. The film was allowed to cure and dry at 60° C. for a minimum of 72 hours in a filtered air atmosphere with forced air circulation. Thereafter, the tubing in a helical configuration was removed from the mandril.

It had an inside diameter of 2.57 cm. and a wall thickness of 0.06 cm.

The tubing formed according to the above procedure was sterilized with ethylene oxide gas and thereafter connected into the lower part of the descending aorta of an experimental pig. The pig was allowed to function in normal manner for a period of 180 days prior to removal of the tubing. Thereafter, the tubing was removed and examined. No detectable pathological effect of the animal was noted nor was there detectable degradation of the tube due to its implantation in the pig.

EXAMPLE 10

The procedure used to formulate the block-copolymer of Example 2 was repeated to provide block-copolymer in solution. At room temperature, 0.25 part by weight of a high purity benzoyl peroxide was added for every 100 parts of the solution. The peroxide was added slowly with rapid stirring. Thereafter, stirring was continued for an additional hour. The solution was then cast onto a flat surface, allowed to dry at room temperature in a filtered air atmosphere, and finally heated to 80° C. and maintained at this temperature for 60 minutes to cure the block-copolymer. The film was then stripped from the smooth surface. Tensile and elongation properties were determined and compared with those of the block-copolymer of Example 2. A property increase of about 50% was found for the cured polymer.

EXAMPLE 11

The procedure of Example 8 was repeated to prepare a solution of a polyether urethane poly(dimethylsiloxane) copolymer. A precleaned, highly polished stainless steel mandril was dipped into solution and allowed to partially dry. While in a semidry condition, the tube while still on the mandril was wrapped with one layer of a number 20 Dacron mesh fabric presoaked in purified anhydrous tetrahydrofuran. The Dacron wrapped tube was then dipped into the block-copolymer solution to deposit an additional layer over the Dacron fabric. The tube while still on the mandril was allowed to dry completely at room temperature and subsequently maintained at 80° C. for one to two hours. It was removed from the mandril. Final dimensions of the tube are 1.8 cm. inside diameter, 12.5 cm. length and 0.03 cm. wall thickness. With appropriate sterilization it is suitable for use as a saturable aoratic graft.

EXAMPLE 12

The procedure of Example 8 was repeated to provide the polyether urethane poly(dimethylsiloxane) block-copolymer in solution. A tubing of 1.2 cm. inside diameter, 25 cm. length and having a wall thickness of about 0.03 cm. was prepared by dipping a precleaned highly polished stainless steel mandril into the copolymer solution at room temperature. The so-formed tube on the mandril was allowed to dry to semidryness and wrapped helically with a nylon filament of 0.01 cm. diameter at a pitch of from 2 to 4 mm. The nylon filament was presoaked in anhydrous dioxane. To secure the ends of the filament as well as to provide suturable ends, the tubing was wrapped at both ends with 1.0 to 1.5 centimeter lengths of a No. 20 Dacron mesh fabric. Thereafter, the mandril containing the tube was dipped into the block-copolymer solution until an additional total of about 0.03 cm. of film becomes deposited. The resulting reinforced tubing was allowed to dry completely at room temperature, subsequently heated at 80° C. for a period of 1 to 2 hours and removed from the mandril. The tube so formed has suturable ends and may be bent without kinking of the walls which is important in avoiding turbulent flow in the implanted prosthesis.

EXAMPLES 13–18

A series of three block-copolymers were formed from an acetate end-blocked poly(dimethylsiloxane) and a polyester urethane, each of the block-copolymers differing in their ratio of homopolymer components. The polyester urethane had an intrinsic viscosity of 0.45 dl./g. as measured in dioxane at 25° C. and a total nitrogen content of about 1.1% as determined by combustion. The polyester urethane was prepared from hydroxy-terminated poly(ethylene glycol) terephthalate and 1,5-naphthalene diisocyanate using known procedures and a 1:1 combination of ethylene glycol and glycerol as a chain extender. The polysiloxane was an acetate end-blocked poly(dimethylsiloxane) having an intrinsic viscosity of 0.24 dl./g. as measured in absolute toluene at 25° C., and a terminal silanol group content of about 9 per molecule. Each of the block-copolymers was formed by the following procedure.

The polyester urethane was added to a solution of about 50 parts by weight dioxane and 100 parts by weight tetrahydrofuran, both solvents having been purified and made anhydrous by repeated fractional distillations. The acetate end-blocked poly(dimethylsiloxane) was dissolved in purified anhydrous tetrahydrofuran and added to the polyester urethane solution. The resulting mixture was agitated and maintained within a temperature range of from 50 to 60° C. for a period of four to five hours and allowed to cool.

As in Example 1, blood-compatibility was determined by coating the inside walls of test tubes with a solution of the block-copolymer and allowing the same to dry. Approximately 3 to 5 ml. of freshly drawn whole blood was added to test tubes coated with the block-copolymers and time to coagulate at 37° C. was measured. For purposes of comparison, freshly drawn whole blood from the same donor in amounts of 3 to 5 ml. was added to uncoated glass test tubes, tubes coated with the polyester urethane homopolymer, and tubes coated with the poly(dimethylsiloxane) homopolymer. Coagulation time as well as the weight percentage of polyurethane and poly(dimethylsiloxane) is set forth in the following table:

| | Polyurethane | poly(Dimethylsiloxane) | Coagulation time, min.[1] |
|---|---|---|---|
| Example No.: | | | |
| 13 | 95 | 5 | 45 |
| 14 | 90 | 10 | 46 |
| 15 | 85 | 15 | 42 |
| 16 | 100 | 0 | 31 |
| 17 | 0 | 100 | 28 |
| 18 | uncoated glass | | 6 |

[1] Average of 5 tubes.

In all cases, clotting time of blood in contact with the block-copolymers of this invention was substantially greater than clotting time of blood in contact with the other surfaces.

EXAMPLES 19 TO 24

A series of four block-copolymers were formed from a polyether urethane and a poly(dimethylsiloxane), each of the block-copolymers differing in their ratio of homopolymer components. The same procedure was used to form each of the block-copolymers as follows.

A solvent was prepared comprising 50 parts by weight of dioxane and 100 parts by weight 4-methyl-2-pentanone. Each of the solvents in the mixture was purified by repeated fractional distillation. The polyether urethane was dissolved in the solvent mixture with heating and continuous stirring. The polyether urethane used was formed from a polypropylene glycol having an average molecular weight of 450 and a mixture of 2,4- and 2,6-toluene diisocyanate following procedures known in the art. The polyether urethane had an intrinsic viscosity of 0.24 dl./g. as measured in dioxane at 25° C. and a total nitrogen content of about 3.3% by weight. Air was excluded from the reaction vessel and one part by weight of freshly distilled acetic anhydride together with the appropriate quantity of a hydroxyl terminated poly(dimethylsiloxane) were added slowly to the solution. The poly(dimethylsiloxane) was one having an intrinsic viscosity of 0.04 dl./g. as measured in absolute toluene 25° C. and contained two silanol groups per molecule. The solution was agitated and the temperature maintained at about 108° C. for about three hours. An additional two parts by weight of glacial acetic acid was added to the reaction mixture and heating continued for an additional 3 to 4 hours. The resultant solution contained block-copolymers usable for dip or slush molding, for the fabrication of implantatable devices and the like.

To determine blood-compatibility of the above block-copolymers, films are cast on the inside walls of test tubes and coagulation time measured in the manner of Example 1. In addition, coagulation time for blood in uncoated test tubes and tubes coated with the polyether urethane homopolymer was determined for purposes of comparison. Coagulation time as well as the weight percentage of polyurethane and poly(dimethylsiloxane) is set forth in the following table:

| | Polyurethane | poly(Dimethylsiloxane) | Coagulation time, min.[1] |
|---|---|---|---|
| Example No.: | | | |
| 19 | 90 | 10 | 60 |
| 20 | 80 | 60 | 45 |
| 21 | 70 | 30 | 50 |
| 22 | 60 | 40 | 45 |
| 23 | 100 | 0 | 24 |
| 24 | uncoated glass | | 6 |

[1] Average of 5 tubes.

All of the block-copolymers of this invention have a low surface free energy and exhibit low adhesion to other materials. Consequently, they find utility as low friction surfaces and in this respect are useful for coatings in a manner analogous to polytetrafluoroethylene (Teflon). They may be used for coating food and process machinery for handling powders, slurries, pastes and the like to prevent adhesion and build-up of deposits. In addition they are useful for devices which slide on ice or snow as skis and sleds. In addition to the above, all of the block-copolymers provide excellent films and sheets that are heat sealable. They have low glass transition temperatures (i.e., —60 to —80° C.) and consequently, show excellent mechanical stability at cryogenic temperatures. Because of these properties, the block-copolymers may be used as freezing bags for storage of perishable materials. For example, they may be used for freezing and storing blood or semen for use in artifical insemination of animals.

Although the invention has been described with reference to certain specific embodiments, it is to be understood that such description is solely for the purpose of illustration and many variations may be made by those skilled in the art without departing from the scope of the invention as set forth in the following claims.

I claim:
1. A block-copolymer comprising blocks of a polysiloxane having a backbone comprising alternating atoms of silicon and oxygen and a predominant amount of blocks of a polyurethane selected from the group of polyether urethanes and polyester urethanes, said polysiloxane blocks and said polyurethane blocks joined by direct silicon to nitrogen bonds, said polysiloxane being essentially linear and having radicals attached to silicon atoms selected from the group consisting of alkyl, alkoxy, aryl, allyl, vinyl and haloalkyl having at least three carbon atoms between the halogen atom and silicon atom.

2. A block-copolymer characterized by a substantial absence of hydrogen bonding sites comprising a major portion of blocks of a polyurethane selected from the group of polyester urethanes and polyether urethanes and a minor portion of blocks of a poly(dialkylsiloxane) having alternating silicon and oxygen atoms, said polyurethane blocks and said poly(dialkylsiloxane) blocks joined by direct silicon to nitrogen bonds.

3. The block copolymer of claim 1 where the polysiloxane is a poly(dimethylsiloxane).

4. The block-copolymer of claim 3 where the poly(dimethylsiloxane) has at least 3 repeating units.

5. The block-copolymer of claim 1 where the poly(dialkylsiloxane) comprises at least 5 weight percent of the copolymer.

6. The block-copolymer of claim 1 where the poly(dialkylsiloxane) is poly(dimethylsiloxane).

7. The block-copolymer of claim 1 where the polyurethane is a polyether urethane formed from a polyalkylene glycol and a diisocyanate.

8. The block-copolymer of claim 7 where the polyalkylene glycol is polypropylene glycol and the diisocyanate is a member selected from the group of methylene bis(4-phenylisocyanate), 2,4-toluenediisocyanate and 2,6-toluenediisocyanate.

9. The block-copolymer of claim 1 where the polyurethane is polyester urethane formed from a hydroxyterminated poly(ethylene glycol) terephthalate and diisocyanate.

10. The block-copolymer of claim 9 where the diisocyanate is 1,5-naphthalene diisocyanate.

11. The block-copolymer of claim 1 cured with a peroxide.

12. A process for the formation of a block-copolymer of a polyurethane selected from the group of polyester urethanes and polyether urethanes and a polysiloxane having a backbone comprising alternating atoms of silicon and oxygen comprising reacting by a condensation type reaction the urethane amide groups of a preformed polyurethane, the polyurethane being present in a predominant amount, with reactive terminal groups of a polysiloxane to form direct silicon to nitrogen bonds, said polysiloxane being essentially linear and having radicals attached to silicon atoms selected from the group consisting of alkyl, alkoxy, aryl, allyl, vinyl and haloalkyl having at least three carbon atoms between the halogen atom and silicon atom.

13. A process for the formation of block-copolymers of a major proportion of a polyurethane selected from the group of polyester urethanes and polyether urethanes and a minor proportion of a poly(dialkylsiloxane) having a backbone comprising alternating atoms of silicon and oxygen, said process comprising reacting by a condensation type reaction the urethane amide groups of a preformed polyurethane with reactive terminal groups of the poly(dialkylsiloxane) to form direct silicon to nitrogen bonds.

14. The process of claim 13 where the reactive terminal groups of the polysiloxane are selected from the group consisting of hydroxyl radicals and acetate radicals.

15. The process of claim 14 where the reactive terminal groups are acetate radicals.

16. The process of claim 14 performed under anhydrous conditions.

17. The process of claim 14 where the polysiloxane is a poly(dialkysiloxane).

18. The process of claim 17 where the poly(dialkylsiloxane) is poly(dimethylsiloxane).

19. The process of claim 17 performed in solution.

20. The process of claim 17 including the step of heating the block-copolymer to a temperature in excess of 100° C. to the effect cure thereof.

21. The process of claim 17 including the steps of adding a peroxide to solution, recovering the block-copolymer from solution and heating the recovered copolymer to a temperature in excess of 100° C. to effect cure thereof.

22. A film formed from the block-copolymer of claim 1.

23. A film formed from the block-copolymer of claim 5.

24. A coating formed from the block-copolymer of claim 1.

25. A coating formed from the block-copolymer of claim 5.

26. A bag characterized by a high degree of blood-compatability formed from the block-copolymer of claim 5.

27. A tube formed from the block-copolymer of claim 5.

28. The tube of claim 27 reinforced with a synthetic fabric.

29. A device for the extracorporeal transfer of blood having its blood-contact surface coated with the block-copolymer of claim 5.

References Cited

UNITED STATES PATENTS

| | | | |
|---|---|---|---|
| 2,901,449 | 8/1959 | Schwarz et al. | 260—824 |
| 3,377,308 | 4/1968 | Oertel et al. | 260—824 |
| 3,463,662 | 8/1969 | Hodes | 260—824 |

OTHER REFERENCES

Weigel: German application 1,070,385, printed Dec. 3, 1959.

Nowak et al.: German application 1,096,521, printed Jan. 5, 1961.

SAMUEL H. BLECH, Primary Examiner

U.S. Cl. X.R.

3—1; 117—161; 128—214

PO-1050
(5/69)

UNITED STATES PATENT OFFICE
CERTIFICATE OF CORRECTION

Patent No. 3,562,352                     Dated     February 9, 1971

Inventor(s) Emery Nyilas

It is certified that error appears in the above-identified patent and that said Letters Patent are hereby corrected as shown below:

Column 2, line 66, for "through" read --though--; Column 2, line 71, after "by" read --the--; Column 2, line 72, for "isocyantes" read --isocyanate--; Column 3, line 4, for "Examplary" read --Exemplary--; Column 3, line 5, for "diisocyanates" read --diisocyanate--; Column 3, line 6, for "diisocyanates" read --diisocyanate--; Column 3, line 8, for "diisocyanates" read --diisocyanate--; Column 3, line 10, for "cyanates" read --cyanate--; Column 3, line 17, for "p,p',p" ' read --p,p'p"--; Column 4, line 33, for "reaction" read --reactions--; Column 4, line 49, for "surface" read --surfaces-- Column 8, line 14, for "saturable" read --suturable--; Column 10, line 42, for "1" read --2--; Column 10, line 46, for "1" read --2--; Column 10, line 49, for "1" read --2--; Column 10, line 51, for "1" read --2--; Column 10, line 59, for "1" read --2--; Column 10, line 65, for "1" read --2--; Column 11, line 36, for "1" read --2--; and Column 12, line 3, for "1" read --2--.

Signed and sealed this 6th day of July 1971.

(SEAL)
Attest:

EDWARD M. FLETCHER, JR.
Attesting Officer

WILLIAM E. SCHUYLER, JR.
Commissioner of Patents